(12) United States Patent
Shindou

(10) Patent No.: US 7,743,863 B2
(45) Date of Patent: Jun. 29, 2010

(54) CARRYING STRUCTURE FOR A VEHICLE BATTERY PACK

(75) Inventor: Tatsuya Shindou, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 291 days.

(21) Appl. No.: 11/819,490

(22) Filed: Jun. 27, 2007

(65) Prior Publication Data

US 2008/0000703 A1    Jan. 3, 2008

(30) Foreign Application Priority Data

Jun. 28, 2006   (JP)   ............................. 2006-177868

(51) Int. Cl.
*B60R 16/04* (2006.01)
(52) U.S. Cl. .................................... 180/68.5
(58) Field of Classification Search ............... 180/65.1, 180/68.5, 89.14, 69.4
See application file for complete search history.

(56) References Cited

U.S. PATENT DOCUMENTS 4,058,182 A * 11/1977 Huber ..................... 180/274
4,076,302 A * 2/1978 Sable ...................... 180/89.14
5,058,016 A * 10/1991 Davidovitch ............... 701/22
5,338,138 A * 8/1994 Pavur et al. ................. 411/107
5,392,873 A * 2/1995 Masuyama et al. ......... 180/68.5
6,439,329 B1 * 8/2002 Vaishnav et al. ........... 180/68.5
7,079,379 B2 * 7/2006 Yamaguchi et al. ........ 180/68.5
2004/0031632 A1 * 2/2004 Kohda et al. ............... 180/68.5
2006/0097507 A1 * 5/2006 Toyota et al. ............... 280/834
2006/0238000 A1 * 10/2006 Tohda et al. ................ 296/204

FOREIGN PATENT DOCUMENTS

| JP | 2004-243885 | 9/2004 |
| JP | 2007-045281 | 2/2007 |

* cited by examiner

*Primary Examiner*—Frank B Vanaman
(74) *Attorney, Agent, or Firm*—Drinker Biddle & Reath LLP

(57) ABSTRACT

A carrying structure for a vehicle battery includes a vehicle floor panel having a step portion that rises upward toward a rear of the vehicle. A battery is arranged at the step portion for feeding electric power to a driving motor that drives driving wheels of the vehicle. A seat is arranged above the battery, and a tip-up mechanism enables the seat to tip up toward a front of the vehicle with a front part of the seat serving as a rotational pivot.

9 Claims, 3 Drawing Sheets

US 7,743,863 B2

CARRYING STRUCTURE FOR A VEHICLE BATTERY PACK

CROSS-REFERENCE TO RELATED APPLICATIONS

This application claims priority under 35 U.S.C. §119 to Japanese Patent Application No. 2006-177868, filed on Jun. 28, 2006, the disclosure of which is incorporated by reference herein in its entirety.

BACKGROUND OF THE INVENTION

1. Field of the Invention

The present invention relates to a type of carrying structure for a vehicle battery pack in an automobile equipped with a driving motor driven by the electric power from the battery pack.

2. Description of Related Art

In recent years, automobiles having a driving motor rotated by electric power from a battery (e.g. secondary battery) as a drive source have been put into practical use. Such vehicles are driven by a driving motor rotated by the electric power from the battery. Such automobiles carry a battery pack configured by connecting plural battery modules in tandem, with each battery module including plural battery cells connected in series. For conventional automobiles, in order to make effective use of the cabin space and to improve safety in a collision, the layout is usually such that the battery pack is arranged below the rear seat (i.e. the second row of seats for vehicles having three rows of seats) on the inner cabin side of the floor panel.

However, in conventional vehicles, the rear seat (i.e. the second row of seats) is mounted on a seat rail, for sliding the seat back-and-forth inside the vehicle body, via a mounting fixture. Consequently, when battery pack maintenance or replacement operations are to be performed, a worker cannot access the battery pack unless the rear seat and seat rails are temporarily removed, making the operation difficult and inefficient.

BRIEF SUMMARY OF THE INVENTION

The present invention relates to overcoming the disadvantages of the related art by providing a carrying structure for a vehicle battery pack that allows battery pack maintenance and replacement operations to be performed more easily.

In an embodiment, the invention provides a carrying structure for a vehicle battery, including a vehicle floor panel having a step portion that rises upward toward a rear of the vehicle, a battery arranged at the step portion for feeding electric power to a driving motor that drives driving wheels of the vehicle, a seat arranged above the battery, and a tip-up mechanism that enables the seat to tip up toward a front of the vehicle with a front part of the seat serving as a rotational pivot.

According to the carrying structure for a vehicle battery pack of the present invention, by tipping the seat toward the front of the vehicle via the tip-up mechanism, easy access to the battery pack arranged at the step portion is gained. As a result, battery pack maintenance and replacement operations can be performed efficiently.

In another embodiment, the invention provides a method of carrying a vehicle battery for feeding electric power to a driving motor that drives driving wheels of the vehicle, including installing the battery on a step portion of a vehicle floor panel, the step portion rising upward toward a rear of the vehicle, and disposing a seat above the battery, the seat including a tip-up mechanism that enables the seat to tip up toward a front of the vehicle with a front part of the seat serving as a rotational pivot.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 6($b$) is a diagram illustrating another example of a securing structure for a battery pack.

DETAILED DESCRIPTION OF THE PREFERRED EMBODIMENTS

Figure 1:
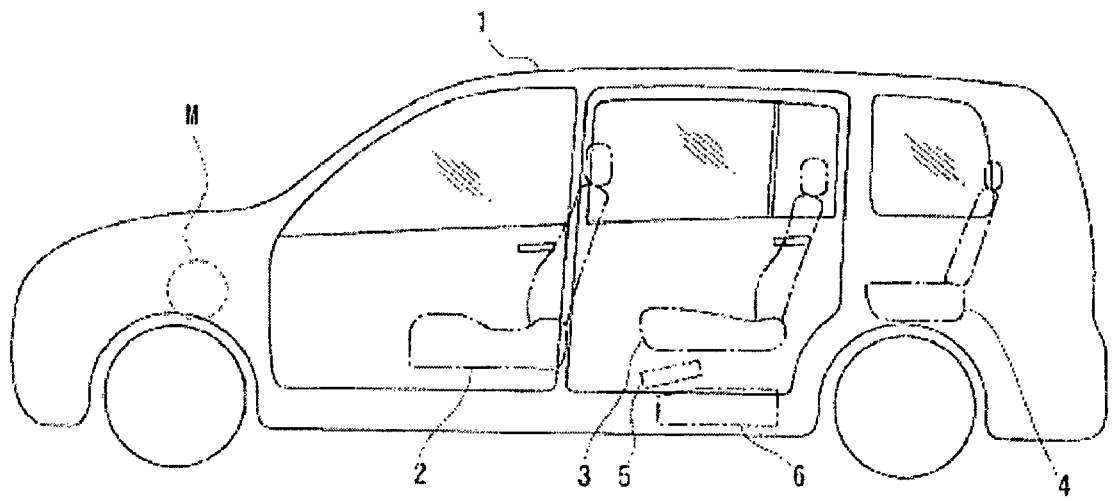
FIG. 1 is a schematic side view illustrating a vehicle adopting the carrying structure for a vehicle battery pack according to an embodiment of the present invention.
Figure 2:
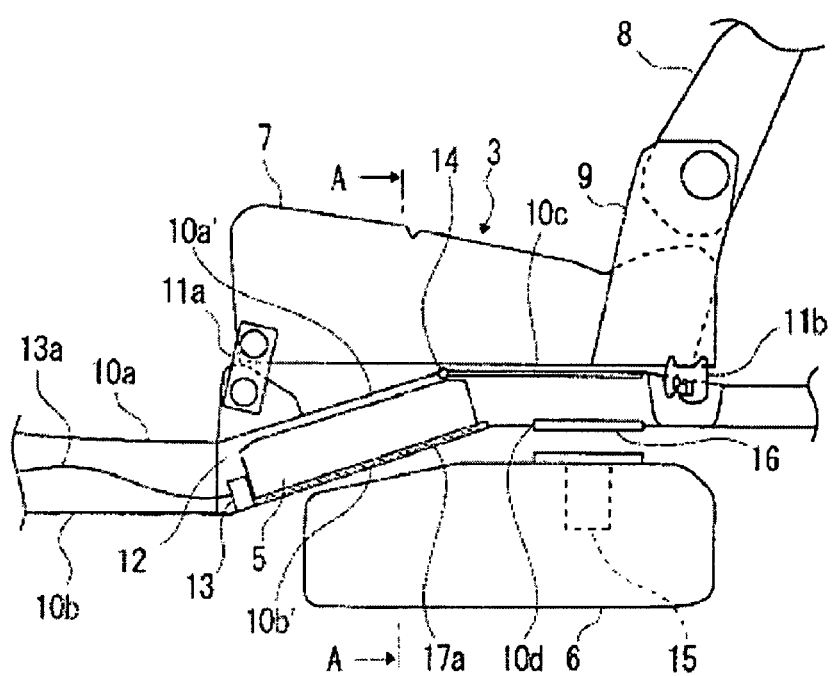
FIG. 2 is a schematic diagram illustrating the vicinity of the rear seat of the vehicle adopting the carrying structure for a vehicle battery pack according to an embodiment of the present invention.
Figure 3:
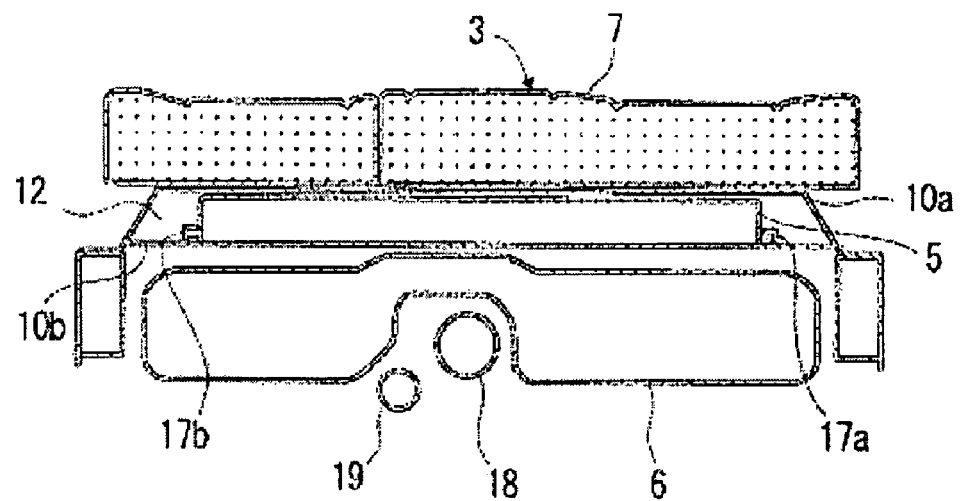
FIG. 3 is a cross section taken across A-A of FIG. 2.

FIG. 1 is a schematic side view illustrating a carrying structure for a vehicle battery pack according to an embodiment of the present invention, in connection with a hybrid automobile having three rows of seats. FIG. 2 is a schematic diagram illustrating the portion near the rear seat (i.e. the second row of seats) of the vehicle including the carrying structure for the vehicle battery pack. FIG. 3 is a cross section taken across A-A in FIG. 2. In FIGS. 1 and 2, the front of the vehicle is to the left side, and the rear of the vehicle is to the right side.

As shown in FIG. 1, vehicle 1 is a hybrid automobile that has a front seat, second-row seat (hereinafter referred to as rear seat) 3, and third-row seat 4. Battery pack 5 for feeding electric power to driving motor M that drives the driving wheels (i.e. the rear wheels in the instant embodiment) is arranged inside the cabin below the rear seat 3, and fuel tank 6 that stores fuel, such as gasoline, to be fed to the engine (not shown in the figure) is arranged outside the cabin below the rear seat 3.

Battery pack 5 is configured by connecting plural battery modules in tandem, with each battery module including plural lithium ion batteries or nickel hydrogen batteries or other suitable secondary batteries connected in series. Battery pack 5 may be formed in the shape of a quadratic prism extending along the lateral direction of the vehicle (see FIG. 3).

As shown in FIG. 2, rear seat 3 includes seat cushion 7 and seat back 8, with seat back 8 being supported by reclining mechanism 9 such that it can be rotated freely in the longitudinal direction of the vehicle. The lower portion of the front surface of seat cushion 7 of rear seat 3 is rotatable fixed by seat attachment fixture 11$a$ arranged between seat cushion 7 and floor upper panel 10$a$. The lower portion of the rear surface of rear seat 3 is held in a quickly lockable/releasable way on floor upper panel 10$a$ by seat locking member 11$b$. As a result, when the locking state with floor upper panel 10$a$ is released by seat locking member 11b, with seat attachment fixture 11a serving as the rotational pivot, seat back 8 falls toward the front of the vehicle, and seat cushion 7 is lifted up, so that rear seat 3 can be folded while it is tipped up toward the front of the vehicle (see FIG. 4). In this manner, seat attachment fixture 11a and seat locking member 11b form a tip-up mechanism or a tip-up means that enables rear seat 3 to tip up toward the front of the vehicle.

As shown in FIG. 2, with respect to the positions of floor upper panel 10a and floor lower panel 10b located in front of rear seat 3, step portions 10a', 10b' are formed in a sloping shape that is inclined upward toward the rear of the vehicle from the front seat 2 side, such that rear seat 3 is disposed higher than front seat 2. The rear part of step portions 10a', 10b' is positioned nearly at the center of seat cushion 7 of rear seat 3, and floor upper panel 10a and floor lower panel 10b are arranged nearly horizontally on the floor toward the rear of the vehicle.

According to the present embodiment, a floor panel is formed by floor upper panel 10a and floor lower panel 10b. Referring to FIG. 2, the upper part of the vehicle with respect to floor lower panel 10b (as well as step portion 10b') is the interior of the cabin, and the lower part of the vehicle with respect to floor lower panel 10b (as well as step portion 10b') is the exterior of the cabin.

Battery pack 5 is accommodated in battery accommodating part 12 arranged between the sloping step portions 10a', 10b'. Because battery accommodating part 12 is formed between step portions 10a', 10b', it is formed inclined upward and toward the rear of the vehicle, toward the region near the center of seat cushion 7 from the region near where seat attachment fixture 11a is mounted on floor upper panel 10a. A vehicle body-side connector 13 for electrically connecting to the battery-side connector (not shown in the figure) of the inserted battery pack 5 is mounted in the deeper part (toward the front of the vehicle) of battery accommodating part 12. Vehicle body-side connector 13 feeds electric power from battery pack 5 to driving motor M via wire 13a connected at one end to vehicle body-side connector 13.

Battery removal part 10c arranged on floor upper panel 10a, positioned toward the rear of the vehicle from the center of seat cushion 7, can be opened/closed freely via hinge 14.

Fuel tank 6 is attached in the region on the cabin outer side (i.e. bottom of the vehicle body) of floor lower panel 10b, below rear seat 3. Fuel tank 6 is sized appropriately so that a front portion nearer the front of the vehicle is positioned below battery accommodating part 12, and a rear portion nearer the rear of the vehicle is positioned below battery removal part 10c. Fuel pump 15 is attached near the rear of the vehicle inside fuel tank 6. Opening 10d is formed in floor lower panel 10b to the rear of step portion 10b' in a position corresponding to that of fuel pump 15. Opening 10d is normally closed by lid 16 that can be readily removed. The upper part of fuel tank 6 toward the front of the vehicle is inclined downward toward the front of the vehicle so that it does not interfere with step portion 10b'.

As shown in FIG. 3, guide members 17a, 17b for holding the two side edge portions of battery pack 5 are respectively arranged on the two lateral sides of battery accommodating part 12 so as to guide battery pack 5 as it is accommodated in battery accommodating part 12. In this embodiment, vehicle 1 is an FR vehicle. As shown in FIG. 3, there is propeller shaft 18 connecting to the rear wheel end. In addition, part number 19 represents an exhaust pipe for exhausting combustion gases from the engine (not shown in the figure). Propeller shaft 18 and exhaust pipe 19 are arranged in the longitudinal direction of the vehicle such that they pass through the lower portion nearly at the center of a recess formed in fuel tank 6.

As shown in FIG. 2, when battery pack 5 is to be installed in battery accommodating part 12 of vehicle 1 formed between step portions 10a', 10b' of floor upper panel 10a and floor lower panel 10b positioned below the front part of rear seat 3, battery pack 5 is inserted with its insertion side facing obliquely downward so that it is guided by guide members 17a, 17b, and the battery-side connector (not shown in the figure) connects to the vehicle body-side connector 13. In this case, the two sides of battery pack 5 are held without play by guide members 17a, 17b.

Figure 4:
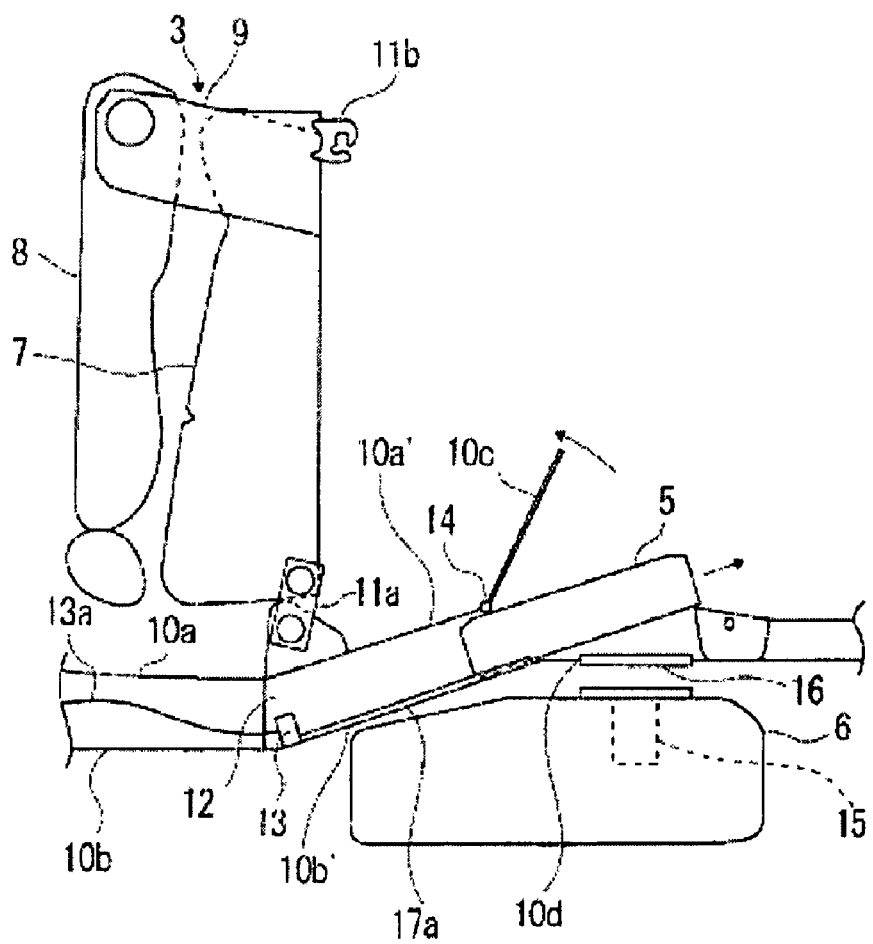
FIG. 4 is a diagram illustrating a state when the battery pack is removed in an embodiment of the present invention.

As shown in FIG. 4, when a maintenance or replacement operation is to be performed for battery pack 5 carried in vehicle 1, seat back 8 is enabled to tip forward around the rotational pivot of seat attachment fixture 11a by unlocking seat locking member 11b from floor upper panel 10a, seat cushion 7 is raised, and rear seat 3 is folded as it is tipped up and forward. Then, battery removal part 10c arranged above the area behind battery accommodating part 12 is opened toward the front of the vehicle via hinge 14, opening the area behind battery accommodating part 12 at the top. Then, when battery pack 5 is pulled out of battery accommodating part 12 into the opened area toward the rear of the vehicle, the connection between the battery-side connector (not shown in the figure) and the vehicle body-side connector 13 is released, and battery pack 5 is removed from battery accommodating part 12 while being guided by guide members 17a, 17b.

When battery pack 5 is installed in vehicle 1, the operation is the opposite of the operation just described. That is, with rear seat 3 tipped up and forward, battery pack 5 is inserted into battery accommodating part 12 via the opened battery removal part 10c, so that while being guided by guide members 17a, 17b, the battery pack 5 moves under its own weight obliquely toward the front of the vehicle into the deeper end of battery accommodating part 12. Finally, the operator presses in battery pack 5 so that vehicle body-side connector 13 is connected to the battery-side connector (not shown in the figure). Then, as shown in FIG. 2, battery removal part 10c is closed, and rear seat 3 that has been tipped up and forward is caused to drop backward and is locked to floor upper panel 10a by seat locking member 11b.

In this case, because battery pack 5 is accommodated in battery accommodating part 12 that is inclined downward toward the front of the vehicle, the intrinsic weight of battery pack 5 is applied to vehicle body-side connector 13, so that a good connection between the vehicle body-side connector 13 and the battery-side connector (not shown in the figure) can be reliably maintained even when the vehicle body vibrates.

As explained above, according to the carrying structure for battery pack 5 of the present embodiment, battery pack 5 accommodated in battery accommodating part 12 arranged between step portions 10a', 10b' can be easily removed via battery removal part 10c behind battery accommodating part 12 simply by folding rear seat 3 while it is tipped up and forward. As a result, maintenance and replacement operations for battery pack 5 can be performed with ease and efficiency.

Figure 5:
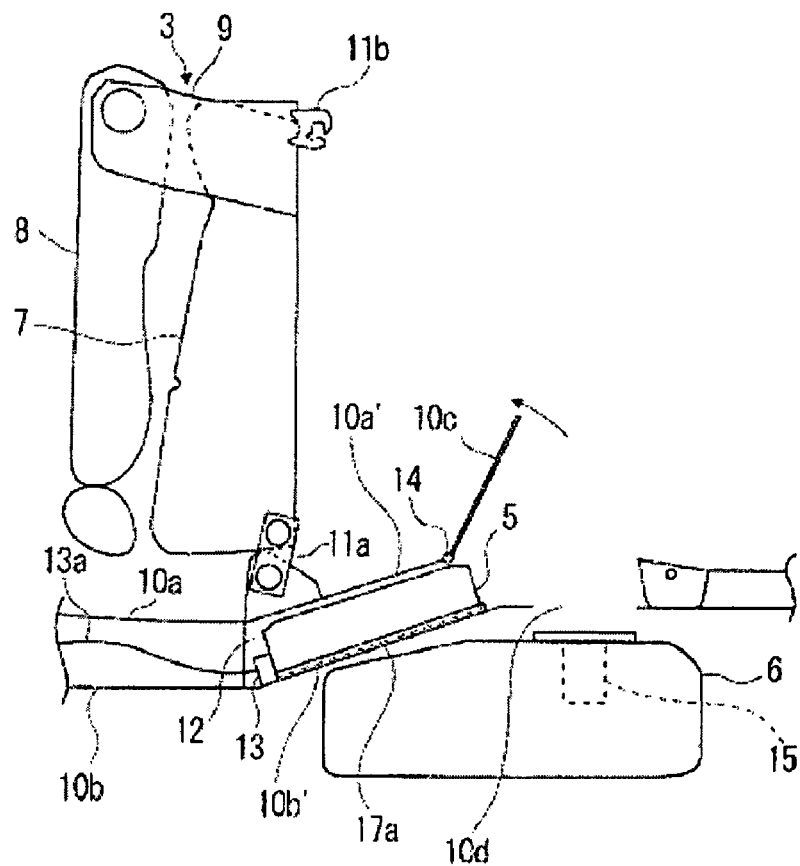
FIG. 5 is a diagram illustrating a state when the fuel pump is accessed in an embodiment of the present invention.

Also, as shown in FIG. 5, when battery removal part 10c is opened while rear seat 3 is tipped up and forward, and lid 16 for opening 10d positioned below battery removal part 10c is removed, the operator can easily access fuel pump 15 in fuel tank 6 through opening 10d from inside the cabin (the upper side in FIG. 5). As a result, without removing fuel tank 6, propeller shaft 18, exhaust pipe 19, etc., it is possible to perform maintenance and replacement operations for fuel pump 15 from inside the cabin with ease and efficiency.

Figure 6:
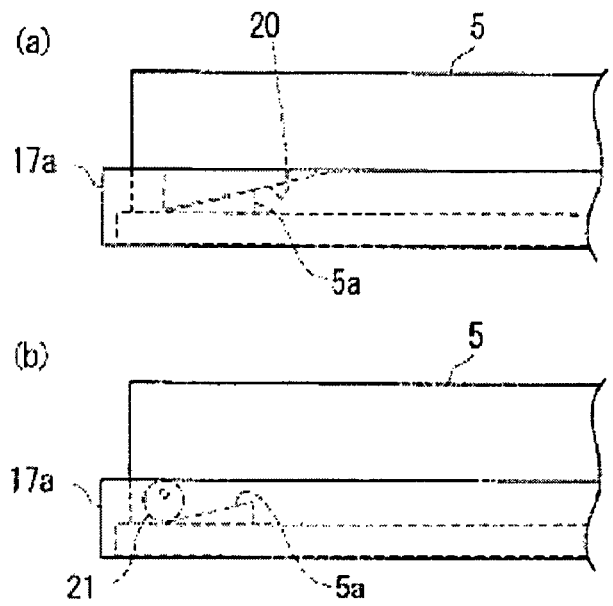
FIG. 6($a$) is a diagram illustrating an example of a securing structure for a battery pack.

In addition, as shown in FIG. 6(a), an inclined engagement piece 20 can be provided as a securing device on the inner side of guide member 17a toward the front of the vehicle (as well as on guide member 17b on the other side) on either side of battery accommodating part 12. As shown in FIG. 6(b), an eccentric cam 21 can be provided as a securing device on the inner side toward the front of the vehicle of guide member 17a (as well as on guide member 17b on the other side) on either side of battery accommodating part 12. Inclined portions 5a formed on the sides of battery pack 5 near the end engage with the engagement piece 20 or eccentric cam 21. As a result, battery pack 5 can be secured in battery accommodating part 12 more reliably.

Also, because rear seat 3 is mounted higher than front seat 2, it is easy to arrange step portions 10a', 10b' inclined upward toward the rear of the vehicle at the rear seat 3 position of floor upper panel 10a and floor lower panel 10b. As a result, by forming battery accommodating part 12 that accommodates battery pack 5 between the step portions 10a', 10b', the structure can be realized by minor reconfiguring, even in the case of reconfiguring a conventional gasoline vehicle or the like into a hybrid vehicle.

While the invention has been disclosed with reference to certain preferred embodiments, numerous modifications, alterations, and changes to the described embodiments are possible without departing from the sphere and scope of the invention, as defined in the appended claims and equivalents thereof. For example, embodiments of the invention have been described in connection with a hybrid vehicle. However, the invention may be used with other vehicles such as vehicles carrying secondary batteries as in EV and fuel cell vehicles. Accordingly, it is intended that the invention not be limited to the described embodiments, but that it have the full scope defined by the language of the following claims.

The invention claimed is:

1. A carrying structure for a vehicle battery for feeding electric power to a driving motor that drives driving wheels of a vehicle, the carrying structure comprising:

a vehicle floor panel having a step portion including a lower floor panel and an upper floor panel each inclined upward toward a rear of the vehicle;

a battery accommodating part formed between the lower floor panel and the upper floor panel for accommodating the battery;

a seat accommodating part for accommodating a seat arranged above the battery; and a tip-up mechanism that enables the seat to tip up toward a front of the vehicle with a front part of the seat serving as a rotational pivot; and a fuel tank accommodating part below the floor panel for accommodating a fuel tank having a fuel pump in an upper portion toward the rear of the vehicle with respect to the battery accommodating part;

the vehicle floor panel including an opening above the fuel pump area that can be readily opened and closed.

2. The carrying structure for a vehicle battery according to claim 1, wherein the rotational pivot for the tip-up mechanism is arranged toward the front of the vehicle with respect to the battery accommodating part.

3. The carrying structure for a vehicle battery according to claim 2, wherein the battery accommodating part includes a battery removal part that can be opened/closed freely in an upper area toward the rear of the vehicle.

4. The carrying structure for a vehicle battery according to claim 2, wherein the battery accommodating part includes a connector that connects to a wire that feeds electric power from the battery to the driving motor of the vehicle.

5. The carrying structure for a vehicle battery according to claim 2, wherein the battery accommodating part includes guide members along two lateral sides tor guiding the battery.

6. The carrying structure for a vehicle battery according to claim 5, wherein the guide members include a securing means for securing the battery pack.

7. The carrying structure for a vehicle battery according to claim 1, wherein the seat is a rear seat.

8. The carrying structure for a vehicle battery according to claim 1, wherein the battery is a battery pack.

9. The carrying structure for a vehicle battery according to claim 1, wherein the battery is a secondary battery.

\* \* \* \* \*